April 18, 1944.　　　R. C. SNEED ET AL　　　2,347,068
EGG GRADING MACHINE
Filed April 13, 1942　　　7 Sheets-Sheet 1
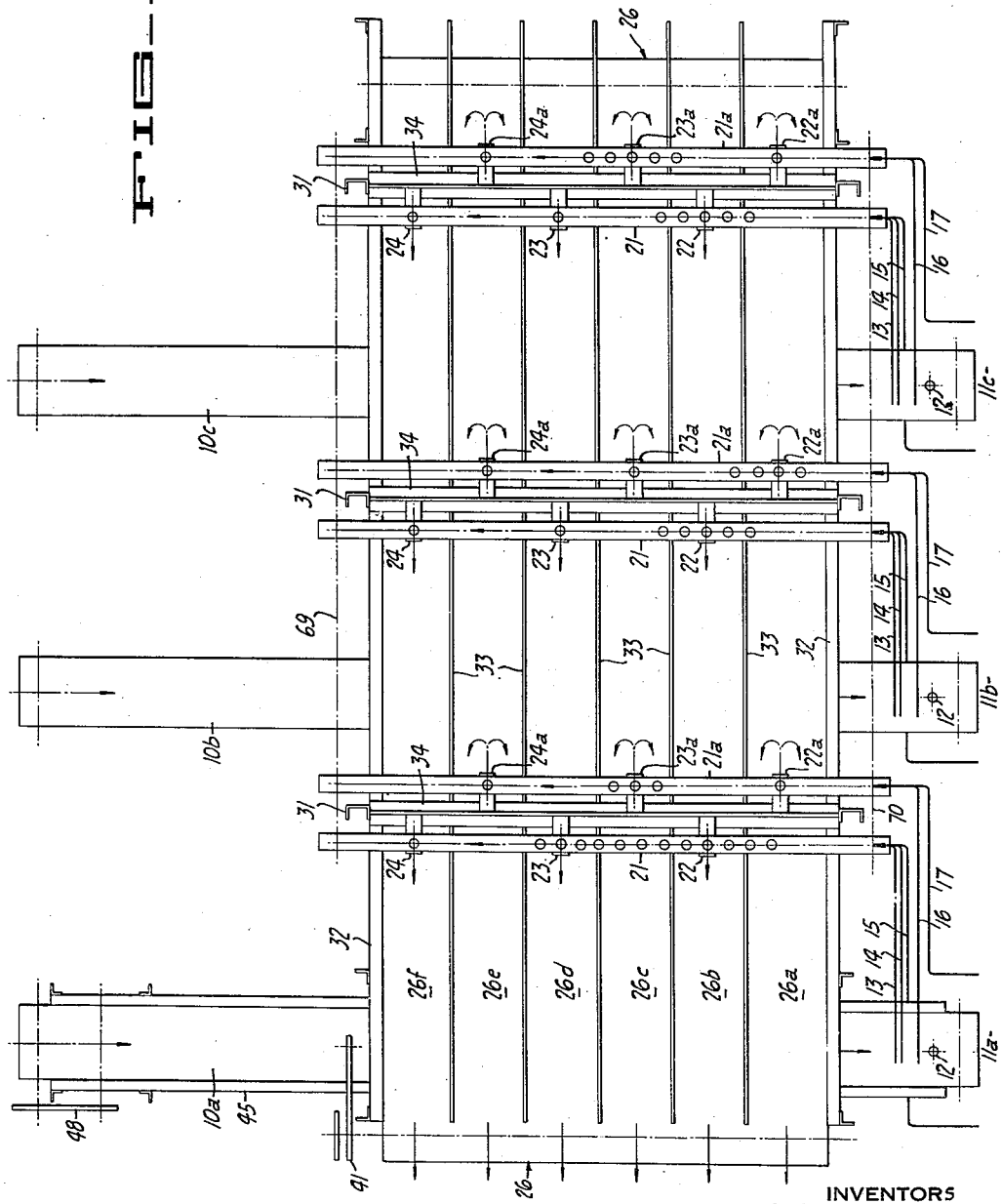
INVENTORS
ROBERT C. SNEED
CURTIS S. JORDAN
BY Paul D. Fisher
ATTORNEY

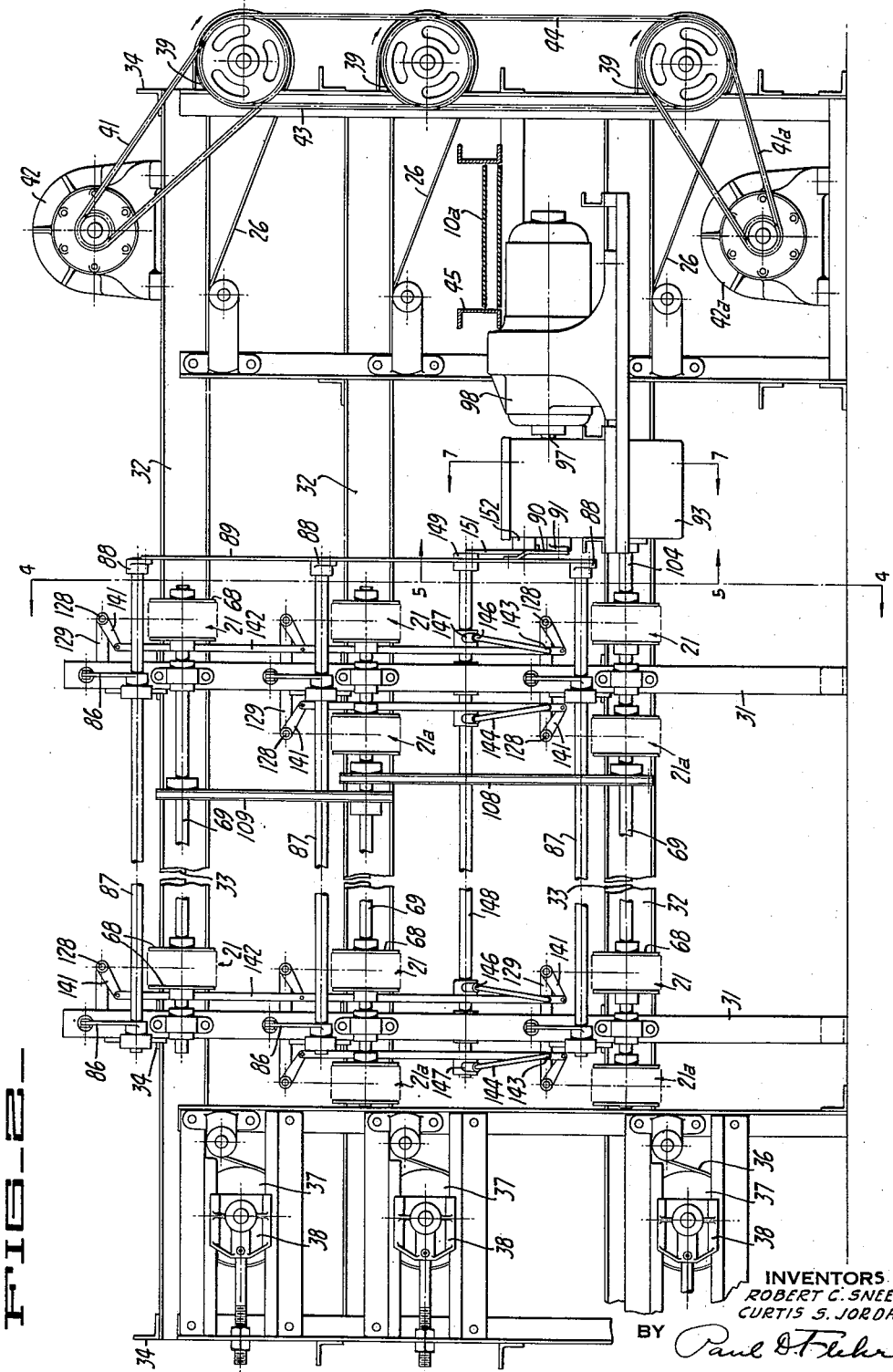

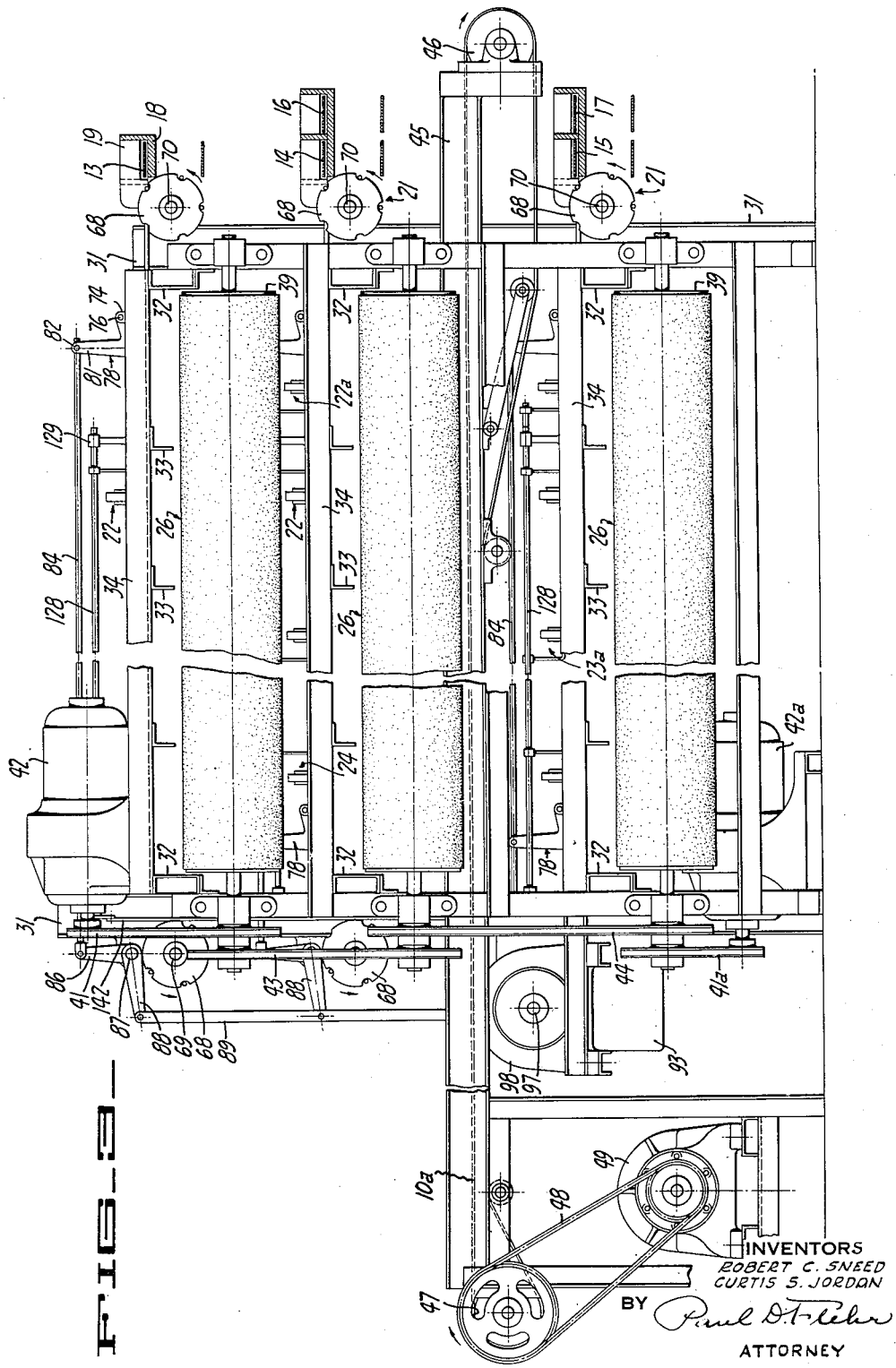

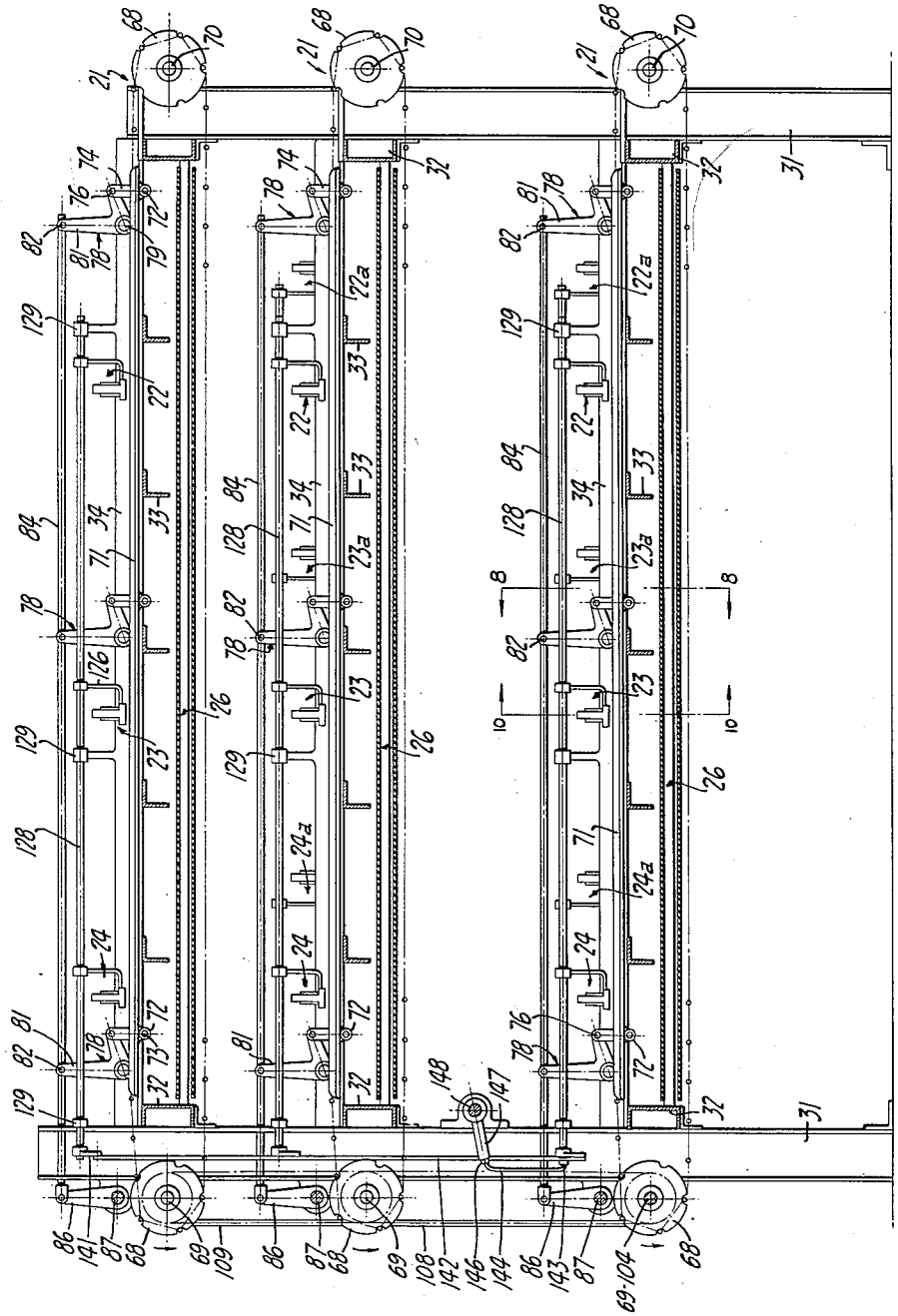

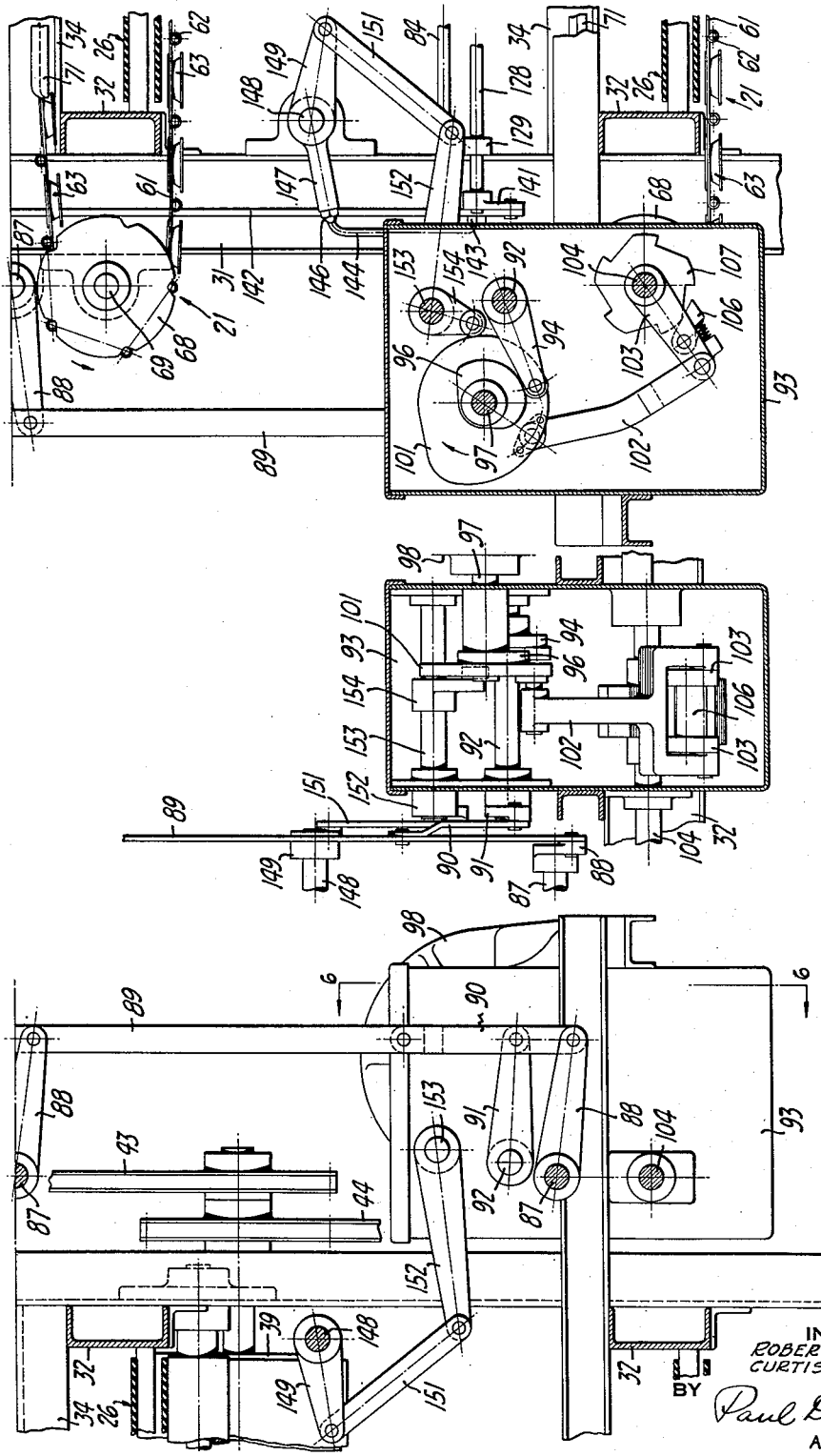

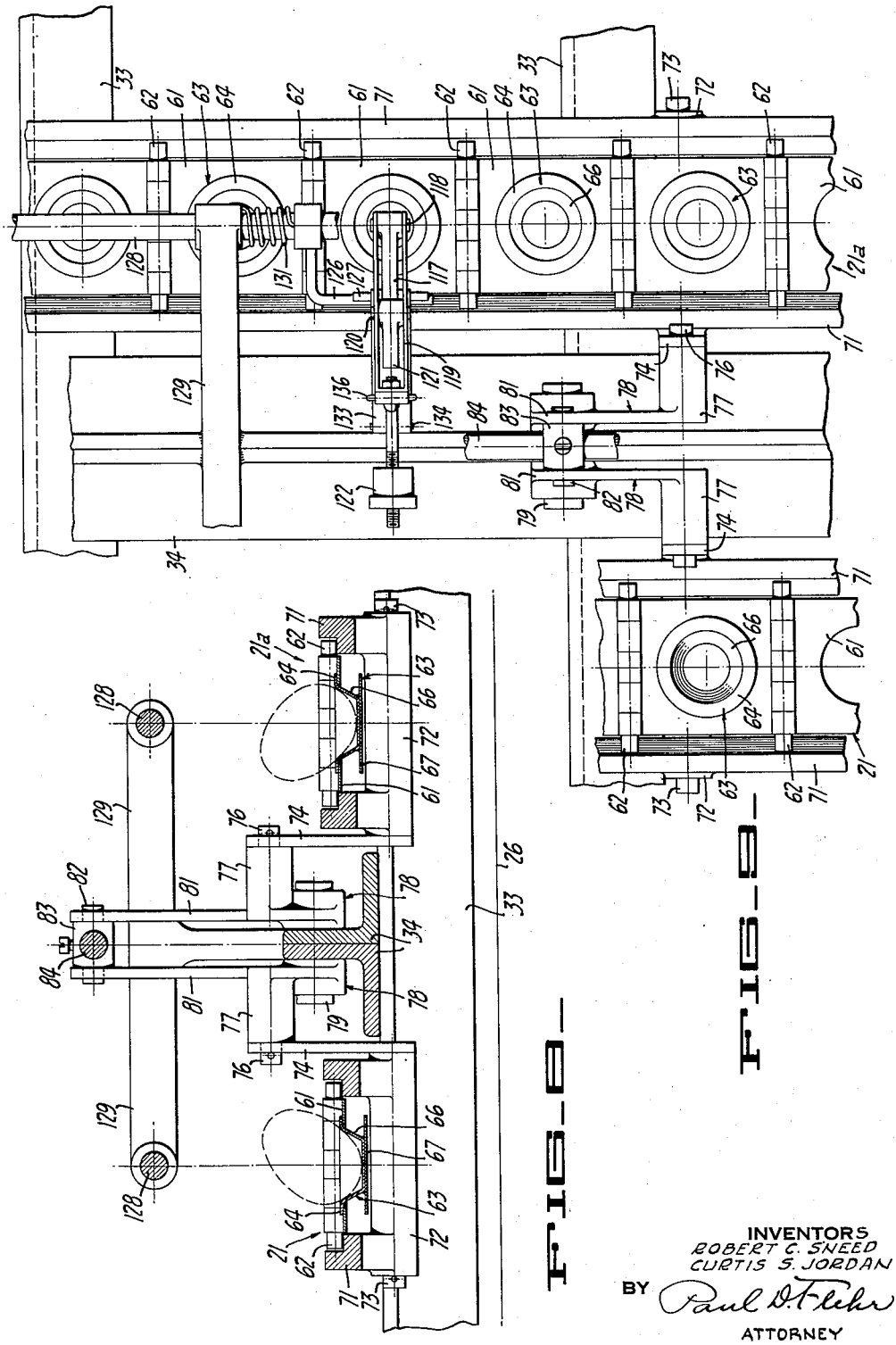

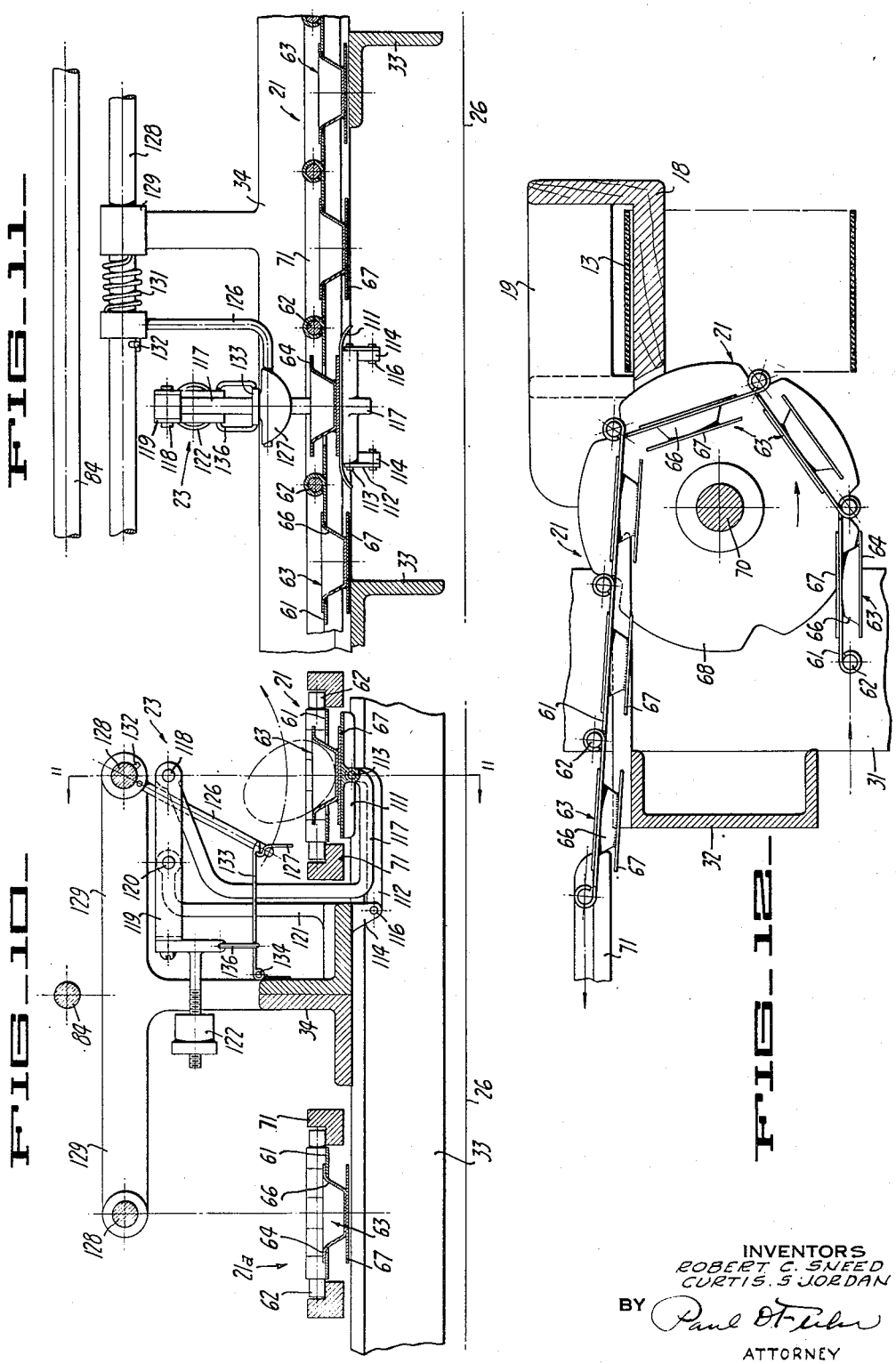

Patented Apr. 18, 1944

2,347,068

UNITED STATES PATENT OFFICE 2,347,068

EGG GRADING MACHINE

Robert C. Sneed, Piedmont, and Curtis S. Jordan, Glendale, Calif., assignors to Safeway Stores, Inc., Oakland, Calif., a corporation of California Application April 13, 1942, Serial No. 438,720

11 Claims. (Cl. 209—121)

This invention relates to egg grading machines and is concerned more particularly with an automatic egg grading machine for handling a large quantity of eggs in a rapid manner without substantial breakage.

It is a general object of the invention to provide an improved egg grading machine wherein an efficient grading operation by weight can be performed in large volume without breaking of the eggs.

Another object of the invention is to provide a machine of the character referred to above wherein various classes of eggs can be handled simultaneously in the same grading machine.

Another object of the invention is to provide an advantageous means for grading eggs by weight.

Other objects and advantages of the invention will be apparent from the following description of a preferred embodiment thereof, as illustrated in the accompanying drawings, in which:

Figure 1 is a diagrammatic plan view illustrating an egg grading machine constructed in accordance with the instant invention.

Figure 2 is a side elevational view of an egg grading machine embodying the instant invention.

Figure 3 is an end elevational view of the machine.

Figure 4 is a transverse sectional view taken as indicated by the line 4—4 in Figure 2.

Figure 5 is a sectional view taken as indicated by the line 5—5 in Figure 2.

Figure 6 is a sectional view taken as indicated by the line 6—6 in Figure 5.

Figure 7 is a sectional view taken as indicated by the line 7—7 in Figure 2.

Figure 8 is a detailed sectional view through a pair of the egg weighing conveyors taken as indicated by the line 8—8 in Figure 4.

Figure 9 is a plan view of a pair of adjacent egg weighing conveyors.

Figure 10 is a fragmentary sectional view taken as indicated by the line 10—10 in Figure 4.

Figure 11 is a sectional view taken as indicated by the line 11—11 in Figure 10.

Figure 12 is an elevational view partly in section showing part of an egg weighing conveyor.

The machine is adapted to have eggs fed in trays to a candling station where they are examined in the usual fashion by an operator who separates them in accordance with their characteristics into different groups. From the candling station each group which is to be graded by weight is fed individually to an egg weighing conveyor which carries the eggs past three successive weighing devices for grading of the eggs by weight into large, medium or small sizes. As the eggs are classified by weight, they are discharged from the weighing devices into discharge conveyors for subsequent packaging.

Referring to Figure 1, three feeding conveyors 10a, 10b, and 10c are provided along which the eggs are carried to respective candling stations 11a, 11b, and 11c. Each candling station is provided with a suitable candling light as indicated at 12, from which the eggs may be classified as to quality and placed on respective conveyors 13, 14, 15, 16, or 17, so that there are five discharges from each candling station which lead to five sets of weight grading devices. Conveyors 13 to 17 may be driven in any suitable manner and, as seen in Figure 3, have their upper stretches supported on suitable supports 18 having a side wall 19 which is angled or curved at one end to direct the eggs onto the associated weighing conveyor.

The weight grading devices are in the form of weighing conveyors, as indicated generally at 21, each of which travels past three weighing devices 22, 23, and 24. The weighing conveyors for each candling station are in tiers with one conveyor 21 in the upper most tier, two conveyors 21 and 21a in the middle tier, and two conveyors 21 and 21a in the lowermost tier. The diagrammatic plan view in Figure 1 is representative of a lower tier in which six weighing conveyors are employed.

The three weighing stations 22, 23 and 24 for one weighing conveyor 21 discharge on to respective discharge conveyors 26b, 26d and 26f, while the adjacent weighing stations 22a, 23a, 24a for conveyor 21a have discharge conveyors 26a, 26c and 26e associated therewith.

Referring to Figures 2, 3 and 4, the frame of the machine comprises a series of upright posts 31 in the form of channels to which horizontal frame channel members 32 are suitably secured. Various longitudinal and transverse angle members are also provided for supporting the various parts, as indicated at 33 and 34. The arrangement of the frame is such as to provide for three tiers of conveying belts 26 which are similar and all of which extend longitudinally of the machine. The upper stretch of each belt is divided into the six discharge conveyors 26a, etc., by longitudinal angles 33. Preferably, each belt 26 is formed of a suitable resilient material, such as sponge rubber to insure gentle handling of the eggs.

Referring to Figure 2, each belt assembly is provided with an idler drum 37 at one end, which is adjustably mounted to tension the belt by means of a suitable adjustable bearing 38 guided in suitable ways on the frame 1. At its discharge end the belt 26 is provided with a driving drum 39 having a chain and sprocket connection 41 with a driving motor 42. The shaft for the drum 39 is also provided with a chain and sprocket connection 43 for the middle belt 26 which is similarly connected by chain and sprocket 44 with the lower belt 26. Lower belt 26 is provided with an additional drive arrangement including a chain and sprocket connection 41a with a motor 42a.

The feeding conveyors 10, 10a and 10b are similar and each includes a transverse channel framework 45 (Figure 3) carrying an idler drum 46 at one end and a driving drum 47 at the other. Drum 47 is driven through a chain and sprocket 48 from a driving motor 49 which may be controlled by a suitable "on" and "off" switch at the associated candling station.

As previously explained, the candler places the eggs on one of the feed conveyors 13 to 17, respectively, as indicated in Figure 3, from which they are automatically fed to the associated weighing conveyors 21 and 21a.

As seen in Figure 2, the five weighing conveyors for a candling station are grouped adjacent one of the uprights 31. Because each of the weighing conveyors is similar, only one will be described in detail.

Referring to Figures 9 to 12, each weighing conveyor 21 comprises a series of apertured plates or links 61, each pair of adjacent links 61 having their ends forming a conventional hinged joint including a hinge pin 62 which extends to either side of the links 61. Each link 61 is provided with a movably mounted egg-carrying cup 63 having an upper flange 64, tapered cup portion 66 and a bottom flange 67 which is welded in place after the cup portion is extended through the aperture of the associated link 61. In this way each weighing cup is connected for limited movement relative to the associated link, and because of the conical or tapered shape of the cup portion 66, it can be lifted free of the link or conversely, the link can be lowered away from the cup when the cup is supported from the bottom plate 67. Cups 63 are of a uniform weight for a purpose later described.

The hinge pins 62 (Figure 12) of the conveyor are adapted to engage suitable depressions in spaced apart drive discs 68 (Figures 2 and 12) carried on drive shafts 69 at one end and upon a suitable idler shaft 70 at the other.

The upper stretch of the conveyor has its hinge pins 62 (Figures 8 to 10) riding in respective rails 71 of a track extending entirely across the width of the machine. As seen in Figures 4 and 8, the rails 71 are connected at spaced points along their length by integral bosses 72. Each boss 72 (Figures 8 and 9) pivotally receives a supporting pin 73 secured on an arm 74. Each arm 74 is carried by a pin 76 carried in a boss 77 formed on an arm of a bell crank 78, the adjacent pair of bell cranks 78 being pivotally supported by pin 79 on a pair of cross angles 34 of the frame. The upright arms 81 of adjacent bell cranks 78 are pivotally connected by respective pins 82 to a block 83 secured on a rod 84. Rod 84 (Figure 4) extends transversely of the machine and is operated in a manner hereinafter referred to to raise and lower track rails 71.

It is seen, therefore, that the track 71 and correspondingly the upper stretch of the associated weighing conveyor is mounted for vertical movement, this movement being utilized to deposit the respective egg weighing cups on scales to effect grading of the eggs by weight. As seen in Figures 3 and 4, the rods 84 are each connected at one end to an arm 86 carried on a shaft 87. Each shaft 87 at one end (Figures 2 and 3) carries an arm 88 which is pivotally connected to an upright link 89. Link 89 (Figures 6 and 7) is reciprocated periodically by a link 90 and an arm 91 secured on a shaft 92 suitably journaled in drive housing 93. Within housing 93, shaft 92 has secured therein a cam follower arm 94 (Figure 7) engaging a cam 96 carried on drive shaft 97. As seen in Figure 2, drive shaft 97 is driven by motor 98.

Thus, during each cycle of operation of the machine (each rotation of shaft 97) the tracks and the upper stretches of all the weighing conveyors will be lowered from the position shown in Figure 8 to the position shown in Figure 10 and subsequently lifted back to the Figure 8 position. The tracks are in raised position while the cam follower 94 is following the higher portion of the cam 96. The tracks are lowered as the follower 94 descends from the high position to the concentric low portion of the cam, in which position there is a dwell in the movement of the tracks during which the weighing operation is performed. The dwell which occurs with the tracks raised is utilized to advance the weighing conveyor.

To provide a step by step movement of the weighing conveyor so that they can pick up the eggs and be successively advanced past the respective weighing stations, the cam 101 (Figures 6 and 7) on shaft 97 is connected by a forked pitman 102 to respective arms 103 pivoted on the extension 104 of shaft 69. Links 103 carry a spring-urged pawl 106 engaging a ratchet wheel 107 secured on shaft 104. As seen in Figure 2, shaft 104 carries the lowermost set of drive discs 68 and is connected through chain and sprocket connections 108 with the middle shaft 69 which is connected through chain and sprocket connections 109 with the top shaft 69. Each step of movement of the weighing conveyors is performed with the weighing conveyors lifted and the step of movement is sufficient to move one link onto and another link off the weighing scale as will now be described.

At suitable equally spaced locations along the path of travel of the upper stretch of each weighing conveyor, similar scales are provided which automatically cause discharge of an egg from the egg cup when the combined weight of the egg and the cup exceeds a predetermined amount. Referring to Figures 10 and 11, one such scale is shown including a platform 111 supported by a parallel motion linkage including respective side links 112 pivoted thereto at 113 and to brackets 114 and 116. Intermediate its ends, the platform 111 has an integral arm 117 connected thereto which extends upwardly and outwardly to a pivotal connection 118 with a weighing beam 119. Pivotal connection 118 is directly over the center of platform 111 and an associated weighing cup 63.

Weighing beam 119 is substantially parallel to link 112 and has a pivotal support at 120 on frame bracket 121. Suitable anti-friction bearings are provided at pivots 118 and 120. The weight of the arm 117 and the platform 111 is counterbalanced by an adjustable internally threaded weight 122 on weighing beam 109. The weight 122 can be set so that the beam 119 will be rocked by the combined weight of the weighing cup and the egg therein when such combined weight exceeds a predetermined amount.

To remove eggs exceeding a predetermined amount, egg ejecting means is provided including a kicker arm 126 having a flat kickout or ejecting portion 127 at its lower end. Arm 126 is pivotally mounted on shaft 128, which as seen in Figure 11, is journalled in suitable bosses 129 of the frame in substantial vertical alignment with the supporting axes 113 and 118 of the weighing platform. The position of the arm 126 with respect to the shaft 128 is controlled in part by a coil spring 131 anchored in the boss 129 at one end and having its opposite ends connected to the arm 126. Shaft 128 is provided with a pin 132 (Figures 1 and 11) for purposes of restoring the arm 126 to the position shown in Figure 10 upon rocking of shaft 128. Arm 126 is held in its normal restrained position by a latch 133 pivoted at 134 on the frame of the machine and connected by a link 136 with the weighing beam 119.

Whenever the combined weight of an egg and the associated cup is sufficient to rock arm 119 to lift the latch 133 from the position shown in Figure 10, the kicker arm 126 becomes effective under the influence of its spring 131 to eject the egg from the cup and deposit it on the adjacent rubber conveyor belt 26.

After each weighing operation, the shaft 128 is operated to restore the kicker arms 126 into engagement with their latches 133. As seen in Figure 2, each shaft 128 is connected by an arm 141 to a vertically extending link 142 which has a universal joint connection at 143 with an adjustable link 144. Link 144 has a universal connection at 146 with an arm 147 on a transverse shaft 148. Shaft 148 (Figure 5) is suitably journalled on the frame of the machine and carries an arm 149 connected by a link 151 with an arm 152 secured on shaft 153. Shaft 153 (Figure 7) extends within the housing 93 and carries a cam follower 154 cooperating with a cam 101 so that the restoration of the kicker arms is in a timed relation to the remaining mechanism.

In operation, eggs are fed to the candling stations 11a to 11c on the conveyors 10a to 10c. At each candling station the eggs are picked up and candled by the operator, if of a suitable character for weight grading, are placed on one of conveyors 13 to 17, respectively, in accordance with the grade determined in the candling operation. It will be understood that the conveyors and cooperating parts which may contact the eggs are covered with suitable rubber, for example sponge rubber, to eliminate breakage. The eggs placed on the conveyors 13 to 17 are fed to the respective weighing conveyors associated therewith, and each egg is picked up by a weighing cup 63. The construction of the weighing cup as to diameter, taper and depth is so related to the general shape of an egg that any size or shape of egg will be firmly held in the cup without rocking or moving about during the weighing operation. At the same time the major portion of the egg is exposed above the cup to facilitate the ejecting operation as later described.

The conveyor 21 consisting of a series of cups 63 is operated in intermittent step-by-step fashion so that it advances for each step of movement an amount equal to the length of each weighing cup assembly. Each weighing conveyor 21, as shown in Figure 1, passes by three weighing stations 22, 23 and 24, for example, which are spaced apart distances equal to an integral number of steps of movement of the conveyor so that each time the conveyor stops, a weighing cup 63 is aligned with each of the three weighing devices. Each weighing cup will be successively in cooperative relation with each of the three weighing stations.

When a weighing cup arrives at a weighing station, for example in the position shown in Figure 10, the tracks 71 are lowered to the position shown in Figure 10, where the weighing cup 63 with the egg therein supported on the weighing platform 111 independently of the conveyor 21. Because of the construction of the weighing devices with the weighing platform supported in axes aligned with the center thereof, no bending or side thrust is present which would tend to interfere with an accurate weighing operation.

The first weighing device 22 is so adjusted that any egg weighing an amount to place it in the "large" egg group, together with the weight of the cup, will cause tilting of the weighing beam 119 to lift latch 133 and cause release of the kickout arm 126. Arm 126 sweeps in a counter-clockwise direction as viewed in Figure 10 to remove or eject the egg from the cup and drop it on the rubber conveyor 26b.

If the weight of the egg is insufficient to cause tilting of the weighing beam to release the kickout arm 26 at weighing station 22, the egg in the cup continues its advance to the second weighing station 23 associated with the conveyor 26b. The same operation ensues here, and if the weight of the egg falls in the "medium" egg group, it is ejected from the cup; otherwise it is progressed to the last weighing station 24 whose adjustment is such that any egg not falling in the "large" or "medium" groups will be ejected at the small egg conveyor 26f.

It will be understood that all of the weighing conveyors (15 of said conveyors being shown in the drawings) are driven in timed relation to each other together with a restoration of the kickout arms to latched condition at each weighing station after the weighing portion of each cycle.

As previously pointed out, the operation of the tracks supporting the conveyors is simultaneous in all cases and consists of a raising and lowering movement in each instance, separated by a dwell in both the raised and lowered positions of the track. The dwell in the raised position is utilized for advancing the weighing conveyors for a one-step increment, while the dwell in the lowered position is utilized for weighing and kickout of the eggs from the weighing cups to the discharge conveyors.

We claim:

1. In an egg grading machine, a scale, means for successively effecting weighing of eggs by said scale including an endless conveyor mounted to travel past said scale, said conveyor comprising a series of articulated links and egg carrying cups loosely mounted in each of said links, each cup including spaced apart retaining elements for causing carrying of the cups on both the upper and lower stretches of said conveyor, the intermediate portion of said cup including a part of reduced diameter whereby the cup can be supported independently of the cooperating link, and means for effecting relative positioning of the links and a cup at the scale to cause support of the cup on the scale independently of the cooperating link.

2. In an egg grading machine, a scale, means for successively effecting weighing of eggs by said scale including an endless conveyor mounted to travel past said scale, said conveyor comprising a series of articulated links and egg carrying cups loosely mounted in each of said links, each cup including spaced apart retaining elements for causing carrying of the cups on both the upper and lower stretches of said conveyor, the intermediate portion of said cup being tapered from the open to the closed end thereof whereby the cup can be supported independently of the cooperating link, and means for lowering a link away from the associated cup at the scale to cause support of the cup on the scale independently of the cooperating link.

3. In an egg grading machine, a series of scales spaced along a path and adjusted to respond to different related weights of eggs, a conveyor mounted for step-by-step movement along said path and including a series of hinged links each having an egg-carrying cup, said cups being adapted for successive positioning on said scales during the step-by-step movement of said conveyor, said cups being loosely connected to said links to be supported on said scales while free of said links, a track for supporting the upper stretch of said conveyor, means for adjusting said track between each step of movement of said conveyor to cause free supporting of a cup on an aligned scale, and ejecting means at each scale for ejecting an egg from the associated cup when the combined weight of the egg and the cup exceeds the setting of the associated scale.

4. In an egg grading machine, a series of scales spaced along a path and adjusted to respond to different related weights of eggs, a conveyor mounted for step-by-step movement along said path and including a series of hinged links each having an egg-carrying cup, said cups being adapted for successive positioning on said scales during the step-by-step movement of said conveyor, said cups being loosely connected to said links to be supported on said scales while free of said links, a track for supporting the upper stretch of said conveyor, means for adjusting said track between each step of movement of said conveyor to cause free supporting of a cup on an aligned scale, spring-urged ejecting means at each scale movable from an inactive position to eject an egg from the associated cup when the combined weight of the egg and the cup exceeds the setting of the associated scale, and means operated in time with the movement of said conveyor for restoring said ejecting means to their inactive positions.

5. In an egg grading machine, means for supporting an egg for a weighing operation, a weighing platform to receive said supporting means, a substantially U-shaped member connected to said platform for movement as a unit therewith, one arm of said member providing the point of connection to said platform and the other arm of said member extending over said platform in spaced relation therefrom, and a parallel linkage including a weighing beam for supporting said platform for substantially vertical movement, said linkage having pivotal connections with said platform and with said other arm in substantial vertical alignment with each other and with the center of said platform, a spring-urged kick-out arm having a pivotal supporting axis in substantial vertical alignment with the axes of said pivotal connections, and releasing means for said kick-out arm controlled by said weighing beam.

6. In an egg grading machine, means for supporting an egg for a weighing operation, a weighing platform to receive said supporting means, a substantially U-shaped member connected to said platform for movement as a unit therewith, one arm of said member providing the point of connection to said platform and the other arm of said member extending over said platform in spaced relation therefrom, and a parallel linkage including a weighing beam for supporting said platform for substantially vertical movement, said linkage having pivotal connections with said platform and with said other arm in substantial vertical alignment with each other and with the center of said platform, a kick-out arm having a pivotal supporting axis in substantial vertical alignment with the axes of said pivotal connections, spring means urging said kick-out arm to active position, a latch mounted parallel to said beam for restraining said kick-out arm against movement by said spring means, and a controlling connection from said weighing beam of said latch.

7. In an egg grading machine, a scale, means for successively effecting weighing of eggs by said scale including a conveyor mounted to travel past said scale, a series of spaced egg carrying elements loosely retained by said conveyor for successive movement therewith past said scale, means for driving said conveyor including means for effecting a dwell in the movement of said conveyor as each successive element comes into cooperative relation with said scale, and means for effecting relative positioning of the conveyor and an element at said scale during each successive dwell to cause support of said element entirely by said scale and completely free of physical contact with said conveyor.

8. In an egg grading machine, a scale, means for successively effecting weighing of eggs by said scale including a conveyor mounted to travel past said scale, a series of egg carrying elements carried by said conveyor for movement therewith past said scale, means for effecting relative positioning of the conveyor and an element at said scale to cause support of said element by said scale independently of said conveyor, an ejecting arm pivoted on an axis overlying the conveyor and movable across an egg carrying element on the scale for ejecting an egg from the element, spring means urging said element from said inactive position, a latch normally restraining movement of said element, and means controlled by said scale for moving said latch to an inactive position.

9. In an egg grading machine, a series of scales spaced along a horizontal path and adjusted to respond to different related weights of eggs, a conveyor mounted for step-by-step movement along said path and including a series of egg-carrying elements for successive resting on said scales during the step-by-step movement of said conveyor, said elements being loosely connected to said conveyor and adapted to be supported on said scales free of contact with said conveyor, means for lowering said conveyor between each step of movement thereof to cause free supporting of an element on an aligned scale, ejecting means at each scale for ejecting an egg from the associated element when the combined weight of the egg and the element exceeds the setting of the associated scale.

10. In an egg grading machine, a series of scales spaced along a horizontal path and adjusted to respond to different related weights of eggs, a conveyor mounted for step-by-step movement along said path and including a series of egg-carrying elements for successive positioning on said scales during the step-by-step movement of said conveyor, said elements being loosely connected to said conveyor and adapted to be supported on said scales while free of physical contact with said conveyor, means for lowering said conveyor between each step of movement thereof to cause free supporting of an element on an aligned scale, spring-urged ejecting means at each scale movable from an inactive position across an associated element to eject an egg from the associated element when the combined weight of the egg and the element exceeds the setting of the associated scale, and means operated in time with the movement of said conveyor for restoring said ejecting means to their inactive positions.

11. In an egg grading machine, a weighing scale having a platform on which objects to be weighted can be placed, an endless conveyor comprising a plurality of articulated links, the upper run of the conveyor being arranged to move in a general horizontal direction across the platform, egg holding cups associated with the links, means for loosely retaining each cup to its associated link, each last means serving to support a cup upon its link and free for relative displacement between the link and the cup in a vertical direction, the link and the cup being formed to center the cup in a difinite position with respect to the link when the cup is supported by the link and serving to remove all physical contact between these parts when the link is displaced downwardly with respect to the cup, means for moving the conveyor step-by-step whereby there is a dwell when a cup is above the platform, and means for lowering the conveyor to cause relative downward displacement of a link with respect to its associated cup and to cause the cup to rest upon the platform, whereby at such time the cup and an egg within the same constitute the sole downward force upon the platform.

ROBERT C. SNEED.
CURTIS S. JORDAN.